(12) United States Patent
Bünte

(10) Patent No.: US 7,455,350 B2
(45) Date of Patent: Nov. 25, 2008

(54) ASSEMBLY FOR SOUND-PROOFING CAVITIES

(75) Inventor: Uwe Bünte, Bramsche (DE)

(73) Assignee: Henkel KGaA, Duesseldorf (DE)

( * ) Notice: Subject to any disclaimer, the term of this patent is extended or adjusted under 35 U.S.C. 154(b) by 241 days.

(21) Appl. No.: 10/975,318

(22) Filed: Oct. 28, 2004

(65) Prior Publication Data

US 2005/0072116 A1    Apr. 7, 2005

Related U.S. Application Data

(63) Continuation-in-part of application No. 09/597,351, filed on Jun. 19, 2000, now abandoned, which is a continuation of application No. PCT/DE98/03680, filed on Dec. 15, 1998.

(30) Foreign Application Priority Data

Dec. 19, 1997  (DE) ................................ 197 56 834

(51) Int. Cl.
*B60R 13/08* (2006.01)
(52) U.S. Cl. ................ 296/187.02; 296/39.3; 52/794.1; 52/782.1
(58) Field of Classification Search ............... 296/146.5, 296/146.6, 146.7, 187.02, 39.3; 52/782.1, 52/784.1, 784.11, 784.12, 309.1, 309.9, 794.1, 52/787.12; 264/46.4, 46.5, 46.6
See application file for complete search history.

(56) References Cited

U.S. PATENT DOCUMENTS

| 4,211,590 | A |  | 7/1980 | Steward et al. |
| 4,330,584 | A |  | 5/1982 | Doerer |
| 4,369,608 | A |  | 1/1983 | Miura et al. |
| 5,344,208 | A | * | 9/1994 | Bien et al. ............. 296/187.02 |
| 5,353,571 | A |  | 10/1994 | Berdan et al. |
| 5,419,606 | A |  | 5/1995 | Hull et al. |
| 6,213,540 | B1 |  | 4/2001 | Tusim et al. |
| 6,287,666 | B1 |  | 9/2001 | Wycech |
| 6,419,305 | B1 | * | 7/2002 | Larsen ................... 296/187.02 |
| 6,863,338 | B2 | * | 3/2005 | Stahl ..................... 296/187.02 |

* cited by examiner

*Primary Examiner*—Michael Safavi
(74) *Attorney, Agent, or Firm*—Laurence A. Greenberg; Werner H. Stemer; Ralph E. Locher

(57) ABSTRACT

A configuration for sealing or sound-proofing cavities, for example in the vicinity of a chassis or a body of a motor vehicle, includes two half-shells which are separately produced, which can be locked together and which, in an interlocked state, form a free, outwardly open ring-shaped gap in an outer, intermediate peripheral edge region. The ring-shaped gap is inwardly limited by an inner contour on one of the half-shells. A heat-expansible element as a contoured ring-like plate has a form which substantially corresponds to that of the ring-shaped gap formed between the two half-shells on their outer wall. The configuration is material-saving and can be produced and mounted at low cost.

18 Claims, 4 Drawing Sheets

ASSEMBLY FOR SOUND-PROOFING CAVITIES

CROSS-REFERENCE TO RELATED APPLICATION

This is a continuation-in-part application of application Ser. No. 09/597,351, filed Jun. 19, 2000 now abandoned; which was a continuing application, under 35 U.S.C. §120, of International application PCT/DE98/03680, filed Dec. 15, 1998; the application also claims the priority, under 35 U.S.C. §119, of German patent application No. 197 56 834.3, filed Dec. 19, 1997; the prior applications are herewith incorporated by reference in their entirety.

BACKGROUND OF THE INVENTION

Field of the Invention

The invention relates to a configuration for isolating cavities, in particular in a chassis or a body of a motor vehicle for sealing or sounding, including a retaining device positioned in a relevant cross-sectional region of a cavity for a shaped element made of expansible material.

In a known configuration for moisture sealing and sound insulation in cavities, a single-piece retaining device which is positioned in a relevant cross-sectional region is made of plastic and includes two lateral boundary walls that are connected to one another by inner connecting webs or ribs and have a peripheral contour corresponding approximately to that of the cavity cross section which is to be sealed. A correspondingly shaped element made of expansible material and having the size of the interspace remaining between the two boundary walls of the single-piece retaining device, is introduced into that retaining device. With the supply of heat, e.g. during coating of the body of motor vehicles, the expansible shaped element expands, with the result that the material emerges from the remaining opening between the two boundary walls of the retaining device and thus undergoes fixed connection to an adjacent inner wall of the cavity. That achieves a watertight or sound-insulating separation of the relevant cavity.

However, that process is disadvantageous insofar as the production of the single-piece retaining devices is very costly, due to high mold costs. Furthermore, the introduction of the shaped elements made of expansible material into the retaining device requires a high outlay in terms of installation and time. Although it is only necessary to seal a border region between the inner wall of the cavity and the retaining device, use is made essentially of a full-surface-area expansible shaped element, that is to say one which corresponds approximately to the entire cross section of the cavity. However, that shaped element can only expand in the direction of the cavity at the border and can only expand in the direction of the boundary walls in the central region, if at all. That renders the consumption of expansible material high.

SUMMARY OF THE INVENTION

It is accordingly an object of the invention to provide a configuration for isolating cavities, which overcomes the hereinafore-mentioned disadvantages of the heretofore-known devices of this general type, which is intended for isolating cavities in a sealing and sound-insulating manner and which can be produced cost-effectively with low production and material outlay.

With the foregoing and other objects in view there is provided, in accordance with the invention, a configuration for sealing or sound-proofing a cavity, comprising a retaining device having two separately produced half-shells, one of the half-shells having an inner contour, the half-shells being latched to one another using a latching device with the half-shells disposed at a distance from one another forming an interspace between the half-shells except at the inner contour; and a heat-expansible element constructed as a contoured ring-like plate with an inner circumference substantially corresponding to the inner contour, the heat-expansible element being retained in the interspace. First of all, such a securing device can be produced easily and cost-effectively using uncomplicated injection molds. In addition, the straightforward mold structure allows changes in contour to be carried out quickly and easily. A further advantage is in the straightforward installation of the heat-expansible element in the retaining device, wherein it is possible for the installation operation to be automated. Finally, using the invention achieves a reduction in the amount of expansible material being used, in which it is possible for this reduction to be more than 50%. The reduction in the amount of material being used is achieved according to the invention in that the expansible material, which is constructed as a ring-like plate with an outer contour corresponding to the cross section of the cavity that is to be sealed, is only provided wherever it is actually required for sealing purposes and, with a predetermined flow direction, can also expand without obstruction in the direction of the hollow-body wall which is to be sealed, while the material flow to the center of the half-shell is bounded by the inner contour provided on one half-shell.

In accordance with another feature of the invention, the half-shells have inner surfaces, and latching device is disposed on the inner surfaces for connecting the half-shells.

In accordance with a further feature of the invention, the latching device includes a mushroom-shaped latching element disposed on one of the half-shells and a corresponding latching cylinder disposed on another one of the half-shells.

In accordance with an added feature of the invention, the heat-expansible element has further material-free spaces in the area of the latching device.

In accordance with an additional feature of the invention, the two half-shells are first and second half-shells, the first half-shell has the inner contour, the second half-shell has a region corresponding to the inner contour, the latching device includes a latching opening disposed within the inner contour of the first half-shell and a corresponding latching rib disposed in the region of the second half-shell, and a mushroom-shaped latching element disposed on the second half-shell and a corresponding latching cylinder disposed on the first half-shell.

In accordance with yet another feature of the invention, the two half-shells are first and second half-shells, the latching device is formed of a latching cylinder and of a mushroom-shaped latching element, the latching cylinder is disposed on the first half-shell and the mushroom-shaped latching element is integrally formed on the second half-shell.

In accordance with yet a further feature of the invention, the latching device connects the half-shells to an inner wall of a cavity to be sealed.

In accordance with yet an added feature of the invention, the latching device is integrally formed on the inner surfaces of the half-shells.

In accordance with yet an additional feature of the invention, the half-shells are formed of injection molded plastic.

In accordance with a concomitant feature of the invention, the heat-expansible element has a shape substantially corresponding to the interspace.

With the objects of the invention in view, there is also provided a configuration for sealing or sound-proofing a cavity having a cross-section, comprising a retaining device to be positioned in the cross-section of the cavity, the retaining device having two separately produced half-shells, one of the half-shells having an inner contour, the half-shells being latched to one another using a latching device with the half-shells disposed at a distance from one another forming an interspace between the half-shells except at the inner contour; and a heat-expansible element constructed as a contoured ring-like plate with an outer circumference substantially corresponding to the cross-section of the cavity and with an inner circumference substantially corresponding to the inner contour, the heat-expansible element being retained in the interspace.

Other features which are considered as characteristic for the invention are set forth in the appended claims.

Although the invention is illustrated and described herein as embodied in a configuration for separating cavities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
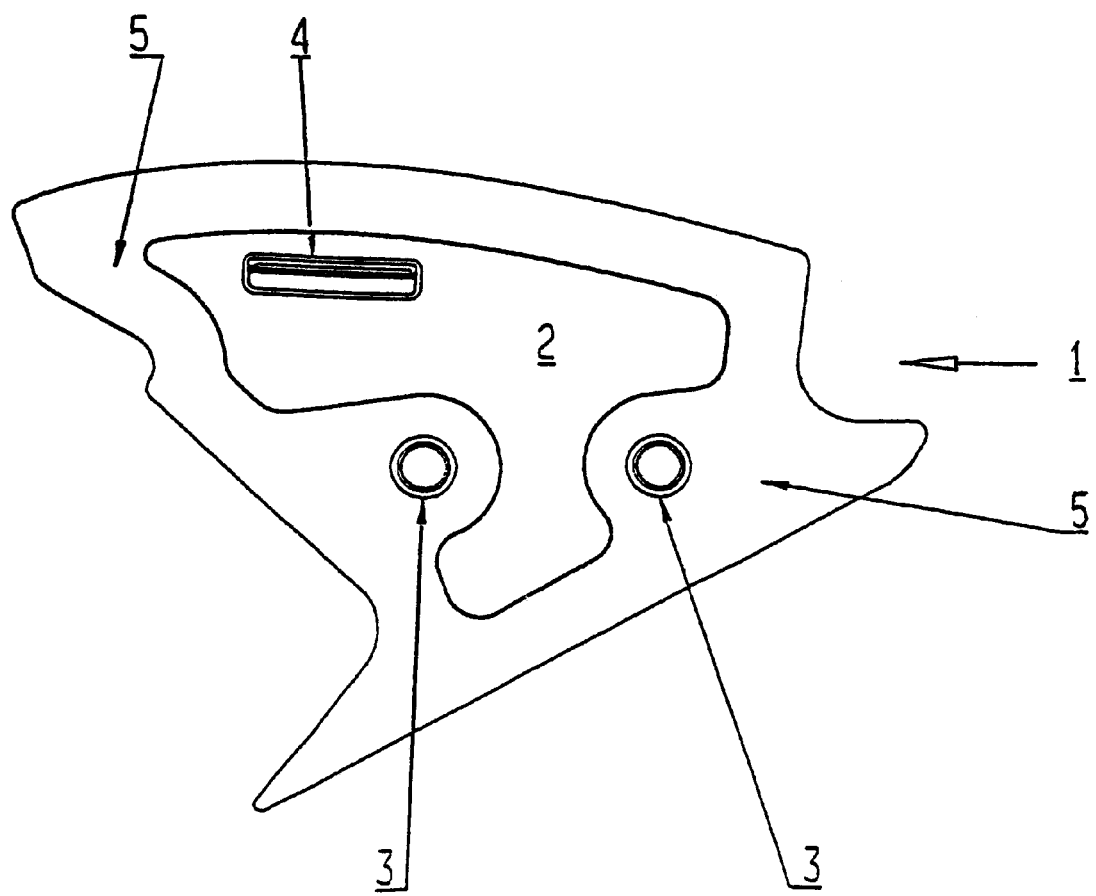
FIG. 1 is a diagrammatic, plan view of an inner surface of a first half-shell.

Referring now to the figures of the drawings in detail, it is seen that a retaining device includes two separate retaining shells which are produced in separate injection-molding operations and can thus be produced by using simple molds, with a low outlay in terms of time and therefore at reduced cost. A first half-shell 1 shown in FIG. 1 has a central region with an inner contour 2 as well as two integrally formed latching cylinders 3 having a height which corresponds to that of a heat-expansible element 8 shown in FIG. 2. A latching opening 4 is located in the elevated inner contour 2 for providing additional latching connection with a latching rib 10 formed on the inner surface of the second half-shell 9 (see FIG. 3). A narrow border region 5 remains between a peripheral edge of the inner contour 2 and a peripheral outer edge of the first half-shell 1.

Figure 2:
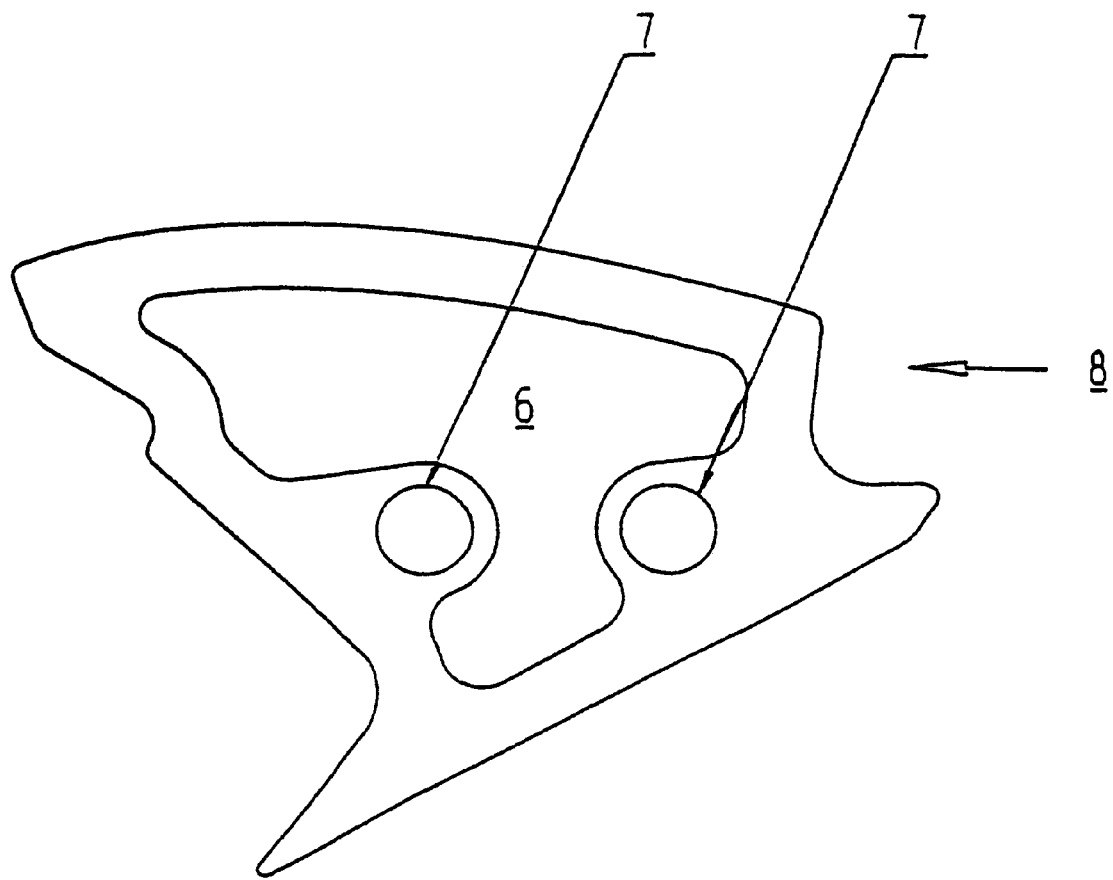
FIG. 2 is a plan view of a heat-expansible element.

The heat-expansible element 8 according to FIG. 2 has material-free spaces 6, 7 with contours that are respectively slightly larger than that of the inner contour 2 and of a circumference of a latching cylinder 3 of the first half-shell 1.

Figure 3:
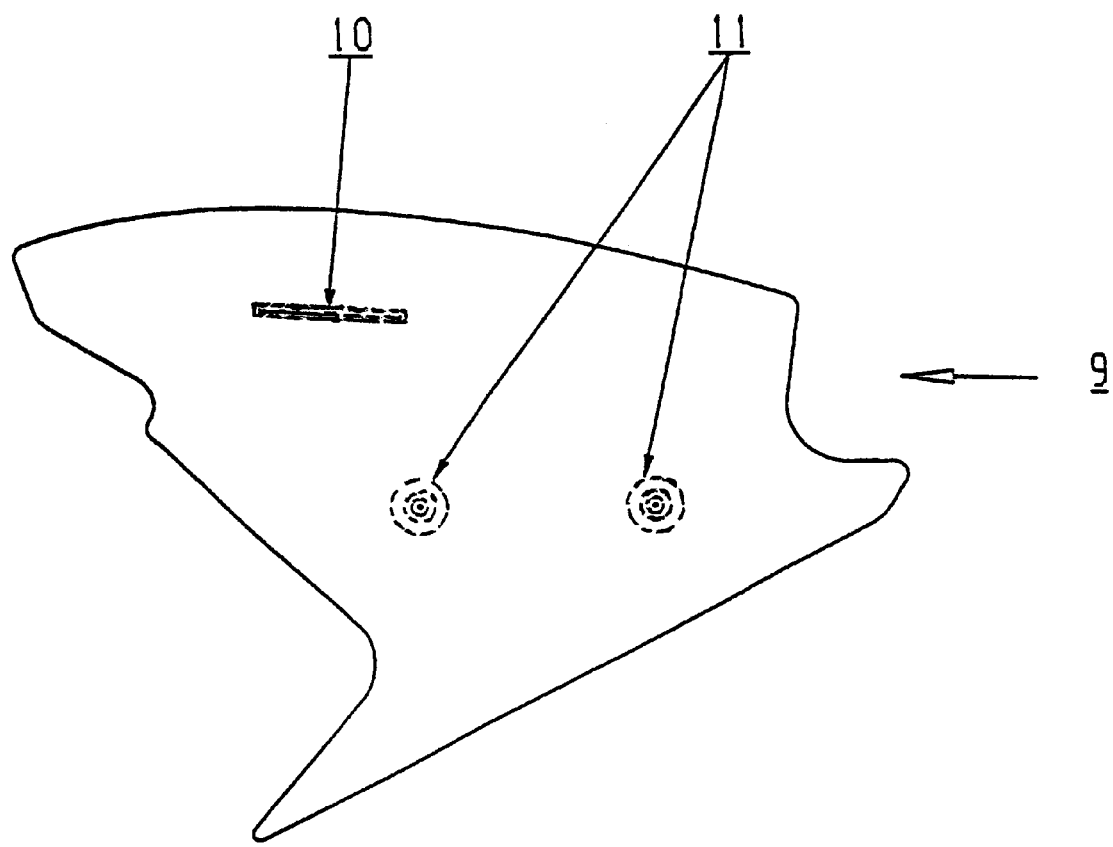
FIG. 3 is a plan view of an outer surface of a second half-shell.

An outer contour of a second half-shell 9 according to FIG. 3 corresponds to that of the first half-shell 1 and that of the heat-expansible shaped element 8. The second half-shell 9 has an evenly formed outer surface, which is visible in FIG. 3, and has a latching rib 10, which is configured to interact with the latching opening 4 on the first half-shell 1, and two mushroom-shaped latching elements 11 (indicated by dashed lines in FIG. 3) on an inner surface thereof.

Figure 4:
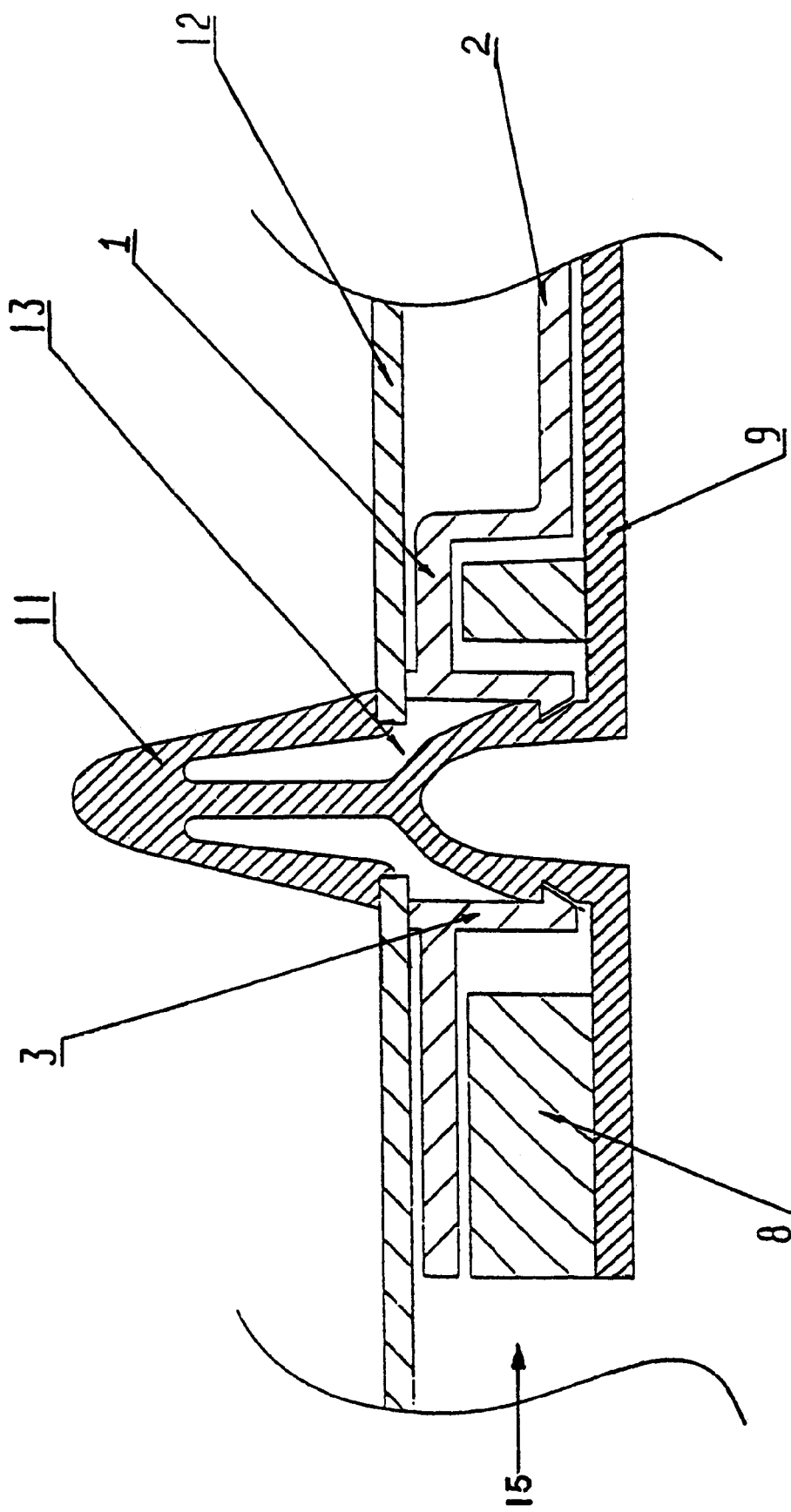
FIG. 4 is a fragmentary, sectional view of a retaining device with the first half-shell of FIG. 1, the heat-expansible element of FIG. 2, and the second half-shell of FIG. 3 in an assembled configuration, in a region of a latching cylinder of the first half-shell and a corresponding latching element of the second half-shell, for fastening to a wall with a cavity.

FIG. 4 is a sectional view of two half-shells 1, 9 which are latched to one another and have the heat-expansible element 8 located inside, in the region of a mushroom-shaped latching element 11 and of a latching cylinder 3. FIG. 4 illustrates, by way of example, how the first half-shell 1 is retained on the second half-shell 9 by a latching connection to the latching cylinder 3 (further latching connection of the latching opening 4 and the latching rib 10 is not shown in FIG. 4). The mushroom-shaped latching element 11, in this case, is simultaneously arrested in an opening 13 in an inner wall 12 of a cavity for connecting the half-shells to the inner wall of the cavity. In this case, the two half-shells 1, 9 are disposed approximately parallel to the inner wall 12 of the cavity. If the retaining device is positioned perpendicularly to the inner wall 12, the mushroom-shaped latching elements 11 are located on outer edges of one of the two half-shells 1 or 9 and extend in a direction from a wall surface thereof.

The function of the configuration for isolating cavities for the purposes of sealing and sound insulation is described below. The two half-shells 1, 9 which are illustrated, for example, in FIGS. 1 and 3, are produced by injection molding corresponding to the cross section which is to be sealed, for example a cavity of a body of a motor vehicle. The corresponding heat-expansible element, which forms essentially a contoured ring-like plate having the outer contour of the cross section to be sealed, is cut to size from heat-expansible material.

In an automated process, the three plates, namely the two half-shells 1, 9 and the shaped element 8, are laid one upon the other, latched to one another and, in this form, are positioned in the relevant cavity. During subsequent heating, the heat-expansible shaped element 8, which fills merely a border region between the two half-shells 1, 9, expands in a predetermined direction, namely in an open gap 15 between the two half-shells, in the direction of the adjacent inner wall 12. Expansion in the inward direction is prevented by the integrally formed inner contour 2 and expansion in the transverse direction is prevented by virtue of the fact that material is not provided there.

I claim:

1. A configuration for sealing or sound-proofing a cavity having an inner wall, comprising:

a retaining device having two separately produced half-shells, one of said half-shells having an inner contour, said half-shells being latched to one another using a latching device with said half-shells disposed at a distance from one another forming an interspace between said half-shells except at said inner contour, said latching device configured for engaging with the inner wall of the cavity and for attaching said half shells to the inner wall of the cavity, said two half-shells being a first half-shell and a second half-shell, said first half-shell having said inner contour, said second half-shell having a region corresponding to said inner contour, said latching device including a latching opening disposed within said inner contour of said first half-shell and a corresponding latching rib disposed in said region of said second half-shell, and a mushroom-shaped latching element disposed on said second half-shell and a corresponding latching cylinder disposed on said first half-shell; and a heat-expansible element constructed as a contoured ring-like plate with an inner circumference substantially corresponding to said inner contour, said heat-expansible element being retained in said interspace.

2. The configuration according to claim 1, wherein said half-shells have inner surfaces, and said latching device is disposed on said inner surfaces for connecting said half-shells.

3. The configuration according to claim 2, wherein said latching device includes a mushroom-shaped latching element disposed on one of said half-shells and a corresponding latching cylinder disposed on another one of said half-shells.

4. The configuration according to claim 1, wherein said heat-expansible element has further material-free spaces in the area of said latching device.

5. The configuration according to claim 2, wherein said two half-shells are first and second half-shells, said latching device being formed of a latching cylinder and of a mushroom-shaped latching element, said latching cylinder being disposed on said first half-shell and said mushroom-shaped latching element being integrally formed on said second half-shell.

6. The configuration according to claim 2, wherein said latching device is integrally formed on said inner surfaces of said half-shells.

7. The configuration according to claim 1, wherein said half-shells are formed of injection molded plastic.

8. The configuration according to claim 1, wherein said heat-expansible element has a shape substantially corresponding to said interspace.

9. The configuration according to claim 1, wherein said latching device connects said half-shells to an inner wall of a cavity to be sealed.

10. A configuration for sealing or sound-proofing a cavity having an inner wall and a cross-section, comprising:

a retaining device to be positioned in the cross-section of the cavity, said retaining device having two separately produced half-shells, one of said half-shells having an inner contour, said half-shells being latched to one another using a latching device with said half-shells disposed at a distance from one another forming an interspace between said half-shells except at said inner contour, said latching device configured for engaging with the inner wall of the cavity and for attaching said half shells to the inner wall of the cavity, said two half-shells being a first half-shell and a second half-shell, said first half-shell having said inner contour, said second half-shell having a region corresponding to said inner contour, said latching device including a latching opening disposed within said inner contour of said first half-shell and a corresponding latching rib disposed in said region of said second half-shell, and a mushroom-shaped latching element disposed on said second half-shell and a corresponding latching cylinder disposed on said first half-shell; and a heat-expansible element constructed as a contoured ring-like plate with an outer circumference substantially corresponding to the cross-section of the cavity and with an inner circumference substantially corresponding to said inner contour, said heat-expansible element being retained in said interspace.

11. The configuration according to claim 10, wherein said half-shells have inner surfaces, and said latching device is disposed on said inner surfaces for connecting said half-shells.

12. The configuration according to claim 11, wherein said latching device includes a mushroom-shaped latching element disposed on one of said half-shells and a corresponding latching cylinder disposed on another one of said half-shells.

13. The configuration according to claim 10, wherein said heat-expansible element has further material-free spaces in the area of said latching device.

14. The configuration according to claim 11, wherein said two half-shells are first and second half-shells, said latching device being formed of a latching cylinder and of a mushroom-shaped latching element, said latching cylinder being disposed on said first half-shell and said mushroom-shaped latching element being integrally formed on said second half-shell.

15. The configuration according to claim 11, wherein said latching device is integrally formed on said inner surfaces of said half-shells.

16. The configuration according to claim 10, wherein said half-shells are formed of injection molded plastic.

17. The configuration according to claim 10, wherein said expansible shaped element has a shape substantially corresponding to said interspace.

18. The configuration according to claim 10, wherein said latching device connects said half-shells to an inner wall of a cavity to be sealed.

* * * * *